United States Patent
Saito et al.

(10) Patent No.: US 12,188,799 B2
(45) Date of Patent: Jan. 7, 2025

(54) PHYSICAL QUANTITY DETECTION DEVICE

(71) Applicant: Hitachi Astemo, Ltd., Hitachinaka (JP)

(72) Inventors: Tomoaki Saito, Hitachinaka (JP); Akira Uenodan, Hitachinaka (JP); Nobuaki Gorai, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 335 days.

(21) Appl. No.: 17/776,658

(22) PCT Filed: Oct. 27, 2020

(86) PCT No.: PCT/JP2020/040167
§ 371 (c)(1),
(2) Date: May 13, 2022

(87) PCT Pub. No.: WO2021/095504
PCT Pub. Date: May 20, 2021

(65) Prior Publication Data
US 2022/0397437 A1 Dec. 15, 2022

(30) Foreign Application Priority Data
Nov. 14, 2019 (JP) .................................. 2019-206443

(51) Int. Cl.
*G01F 1/684* (2006.01)
*G01F 1/696* (2006.01)
(Continued)

(52) U.S. Cl.
CPC ............ *G01F 1/6847* (2013.01); *G01F 1/696* (2013.01)

(58) Field of Classification Search
CPC ........ G01F 1/6847; G01F 1/696; G01F 1/684; G01F 1/6842; G01F 1/692; G01F 15/14; G01F 5/00
See application file for complete search history.

(56) References Cited

U.S. PATENT DOCUMENTS 5,257,547 A 11/1993 Boyer
2004/0060361 A1 4/2004 Kozawa et al.
(Continued)

FOREIGN PATENT DOCUMENTS

DE 10 2005 055 949 A1 5/2007
JP 7-500915 A 1/1995
(Continued)

OTHER PUBLICATIONS

Extended European Search Report issued in European Patent Application No. 20887016.2 dated Nov. 14, 2023 (7 pages).
(Continued)

*Primary Examiner* — Peter J Macchiarolo
*Assistant Examiner* — Anthony W Megna Fuentes
(74) *Attorney, Agent, or Firm* — Crowell & Moring LLP

(57) ABSTRACT

Provided is a physical quantity detection device that can improve physical quantity measurement accuracy over a conventional device. A physical quantity detection device 20 includes a detector including a flow rate detection unit 205, a circuit board 207, a housing 201, and a cover 202. The detector detects a physical quantity and is mounted on the circuit board 207. The housing 201 houses the circuit board 207. The cover 202 is fixed to the housing 201 and defines an auxiliary passage 234 in which the flow rate detection unit 205 is disposed. The housing 201 and the cover 202 include a positioning portion P that includes a pin P1 extending in a thickness direction Dt of the circuit board 207 and a fitting portion P2 into which an end portion P11 of the pin P1 is fitted for positioning between the housing 201 and the cover 202. The pin P1 includes an engagement portion P12 that faces an engagement surface 207f of the circuit board 207 along the thickness direction Dt and restricts movement of the circuit board 207 in a surface direction Df along the front and rear surfaces thereof.

10 Claims, 10 Drawing Sheets

(51) Int. Cl.
    *G01F 1/692*     (2006.01)
    *G01F 5/00*     (2006.01)
    *G01F 15/14*     (2006.01)

(56) References Cited

U.S. PATENT DOCUMENTS

| | | |
|---|---|---|
| 2008/0087858 A1 | 4/2008 | Hatsuzawa et al. |
| 2018/0067093 A1 | 3/2018 | Chen et al. |
| 2019/0120675 A1 | 4/2019 | Watanabe et al. |
| 2019/0323871 A1 | 10/2019 | Uenodan et al. |
| 2020/0158547 A1 | 5/2020 | Yamaguchi et al. |

FOREIGN PATENT DOCUMENTS

| | | | | |
|---|---|---|---|---|
| JP | 2000288205 A | * | 10/2000 | ............... A63F 7/02 |
| JP | 2003249775 A | * | 9/2003 | |
| JP | 2008-96231 A | | 4/2008 | |
| JP | 2011-75519 A | | 4/2011 | |
| JP | 2019-23610 A | | 2/2019 | |
| WO | WO 02/066937 A1 | | 8/2002 | |
| WO | WO-2018138967 A1 | * | 8/2018 | ............. F02D 41/18 |

OTHER PUBLICATIONS

Japanese-language Office Action issued in Japanese Application No. 2021-555984 dated May 9, 2023 (5 pages).
International Search Report (PCT/ISA/210) issued in PCT Application No. PCT/JP2020/040167 dated Feb. 9, 2021 with English translation (five (5) pages).
Japanese-language Written Opinion (PCT/ISA/237) issued in PCT Application No. PCT/JP2020/040167 dated Feb. 9, 2021 (five (5) pages).

* cited by examiner

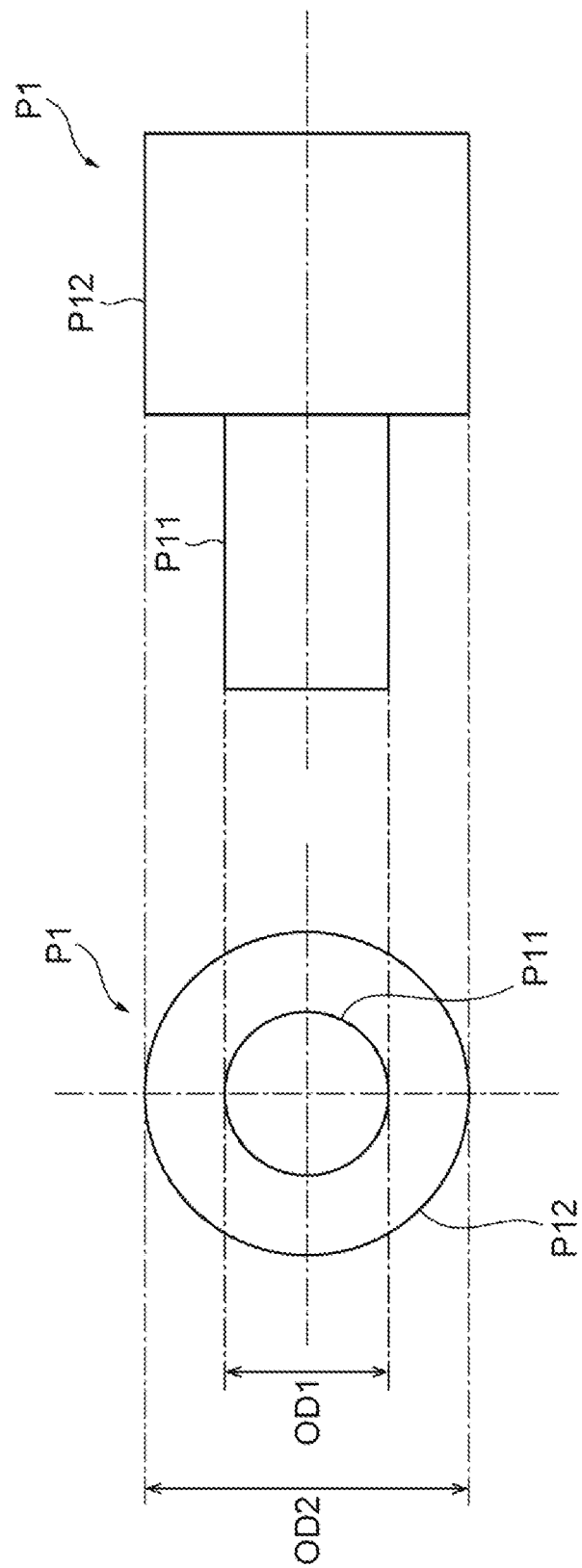

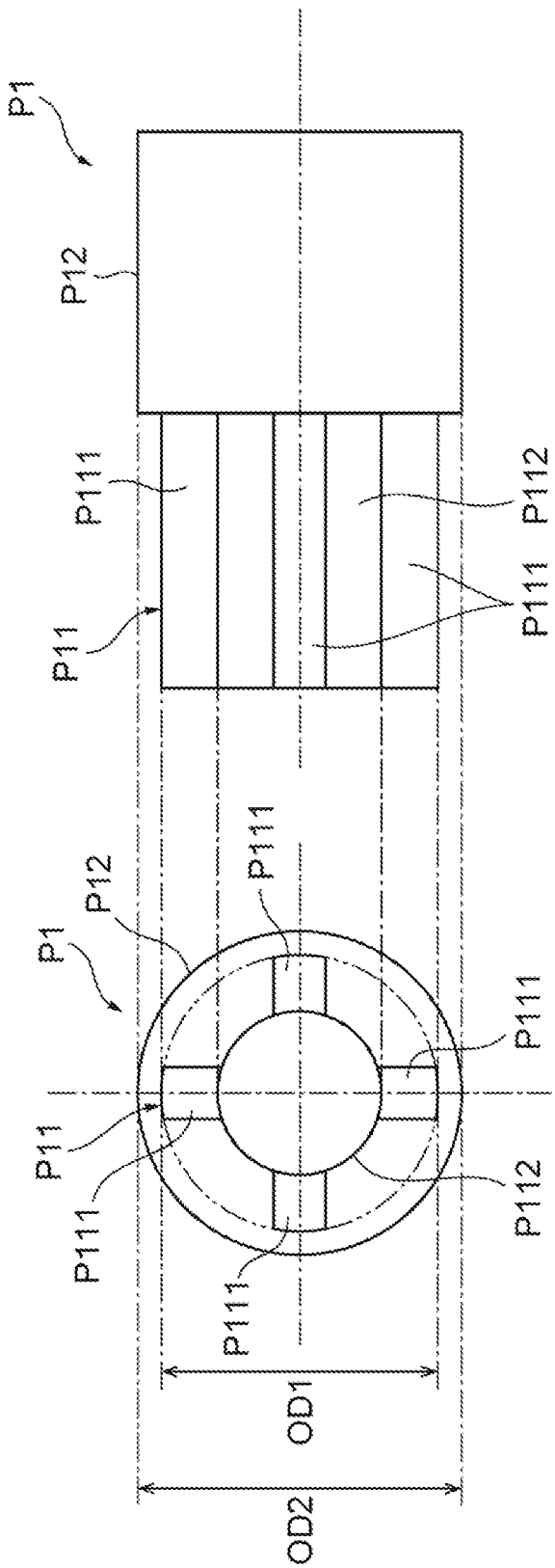

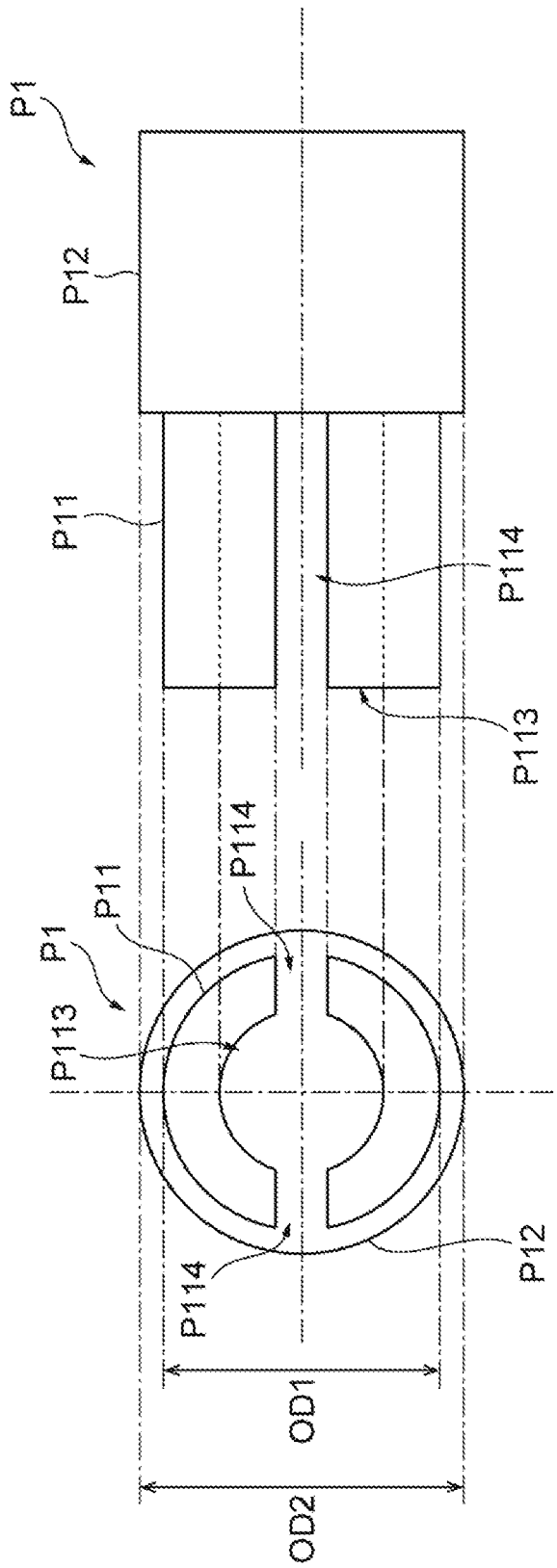

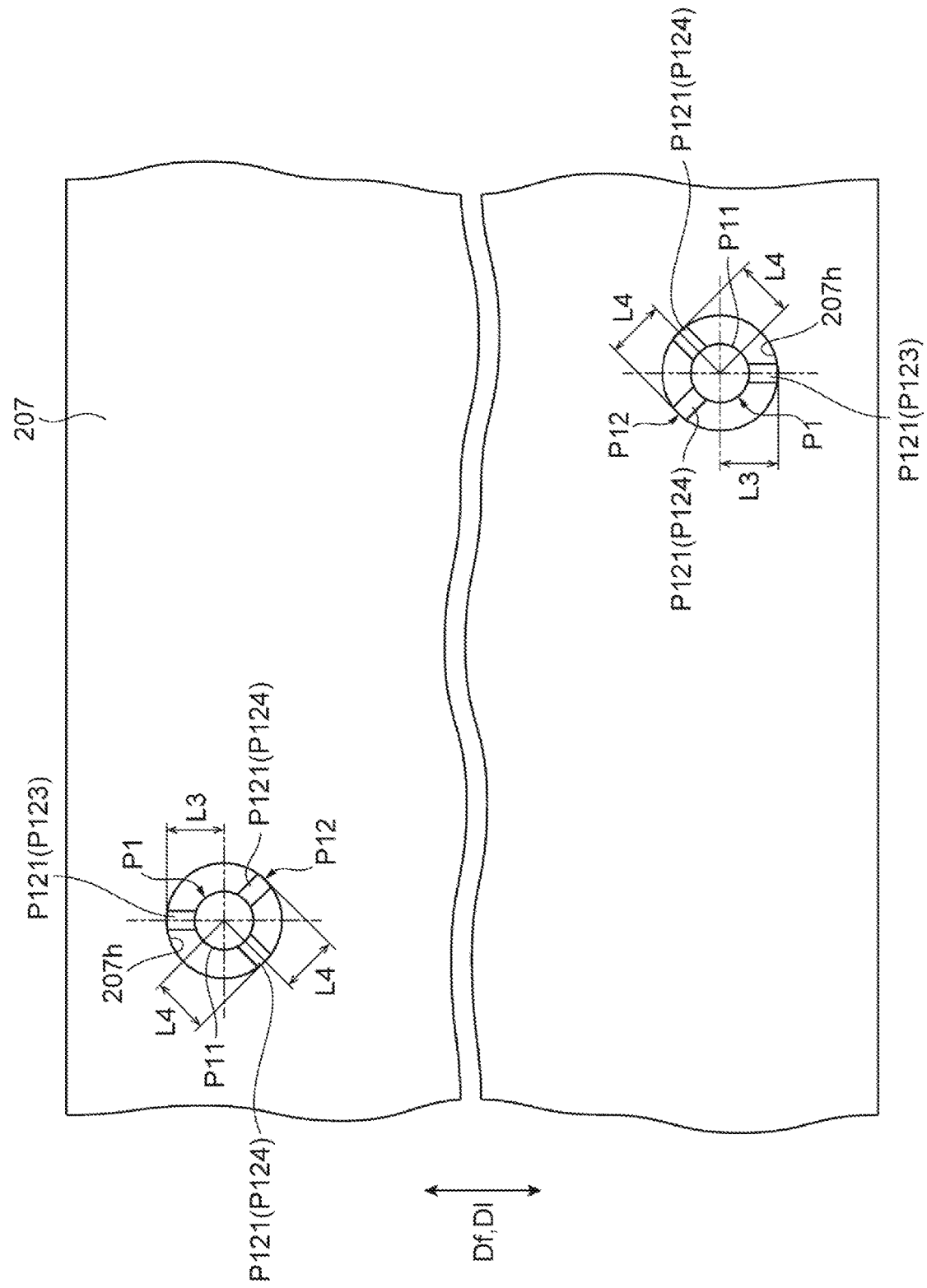

PHYSICAL QUANTITY DETECTION DEVICE

TECHNICAL FIELD

The present disclosure relates to a physical quantity detection device.

BACKGROUND ART

Conventionally, an invention relating to a physical quantity detection device is known, which is suitable for detecting, for example, a flow rate or a pressure of air sucked into an internal combustion engine of an automobile (see Patent Literature 1 below). The conventional physical quantity detection device described in Patent Literature 1 includes a detector for detecting a physical quantity, an electronic circuit electrically connected to the detector, and a housing for accommodating and holding the electronic circuit therein (see claim 1 of the literature, for example).

This conventional physical quantity detection device includes a terminal for connecting the electronic circuit to an external device and a connector housing for surrounding the terminal projected externally of the housing, the terminal and the connector housing being both disposed in the housing. In this conventional physical quantity detection device, a groove for making a part of the terminal exposed therein is formed in a part of a frame portion of the housing in which the terminal communicates the electronic circuit on the inner side and the connector housing on the outer side with each other.

With such a configuration, the terminal and the support member each exposed in the groove can be employed as an adjustment terminal for obtaining output characteristics in adjustment works. As a result, the adjustment works can easily be performed and the manufacturing process can be simplified (see page 3, lines 3 to 5 of the literature).

In addition, a cover is fixedly attached to one surface of the housing, and a metal-made base is mounted to both the other surface of the housing and an open side surface of an auxiliary passage body. This base is properly positioned by pressing projections provided on the auxiliary passage body and projections provided on the housing into corresponding recesses formed in the base and is fixedly mounted in place using an adhesive (see page 8, lines 9 to 17, FIG. 2 of the literature, for example).

CITATION LIST

Patent Literature

Patent Literature 1: WO 2002/066937

SUMMARY OF INVENTION

Technical Problem

In the above-described conventional physical quantity detection device, as the numbers of projections and recesses for positioning between the base and the housing increase, tolerances during assembling the base and the housing increase, thus leading to a lower positioning accuracy. This may cause variations in dimension and shape of individual auxiliary passages, through which gas to be measured flows, defined between the base and the housing of individual physical quantity detection devices, and the accuracy in the measurement of a physical quantity may be affected.

The present disclosure provides a physical quantity detection device that can achieve a higher measurement accuracy in measuring a physical quantity than a conventional device.

Solution to Problem

One aspect of the present disclosure is a physical quantity detection device that includes a detector that detects a physical quantity; a circuit board on which the detector is mounted; a housing that houses the circuit board; and a cover that is fixed to the housing and defines a flow passage in which the detector is disposed. The housing and the cover include a positioning portion. The positioning portion includes a pin extending in a thickness direction of the circuit board and a fitting portion into which an end portion of the pin is fitted for positioning between the housing and the cover. The pin includes an engagement portion that faces an engagement surface of the circuit board along the thickness direction and restricts movement of the circuit board in a surface direction along front and rear surfaces of the circuit board.

Advantageous Effects of Invention

According to the above aspect of the present disclosure, it is possible to provide a physical quantity detection device that can achieve a higher measurement accuracy in measuring a physical quantity by a detector than a conventional device by improving the positioning accuracy of the housing and the cover as compared to the conventional device and reducing the variations in the individual flows of a fluid passing through the flow passage in which the detector is disposed.

BRIEF DESCRIPTION OF DRAWINGS

FIG. 4A shows one example of the shape of a pin of a positioning portion of the physical quantity detection device shown in FIG. 2.

FIG. 4C shows one example of the shape of a pin of a positioning portion of the physical quantity detection device shown in FIG. 2.

FIG. 4E shows one example of the shape of a pin of a positioning portion of the physical quantity detection device shown in FIG. 2.

FIG. 5 shows one example of the arrangement of pins and through-holes of a circuit board of the physical quantity detection device shown in FIG. 3.

DESCRIPTION OF EMBODIMENTS

The following will describe embodiments of the physical quantity detection device according to the present disclosure with reference to the drawings.

First Embodiment

Figure 1:
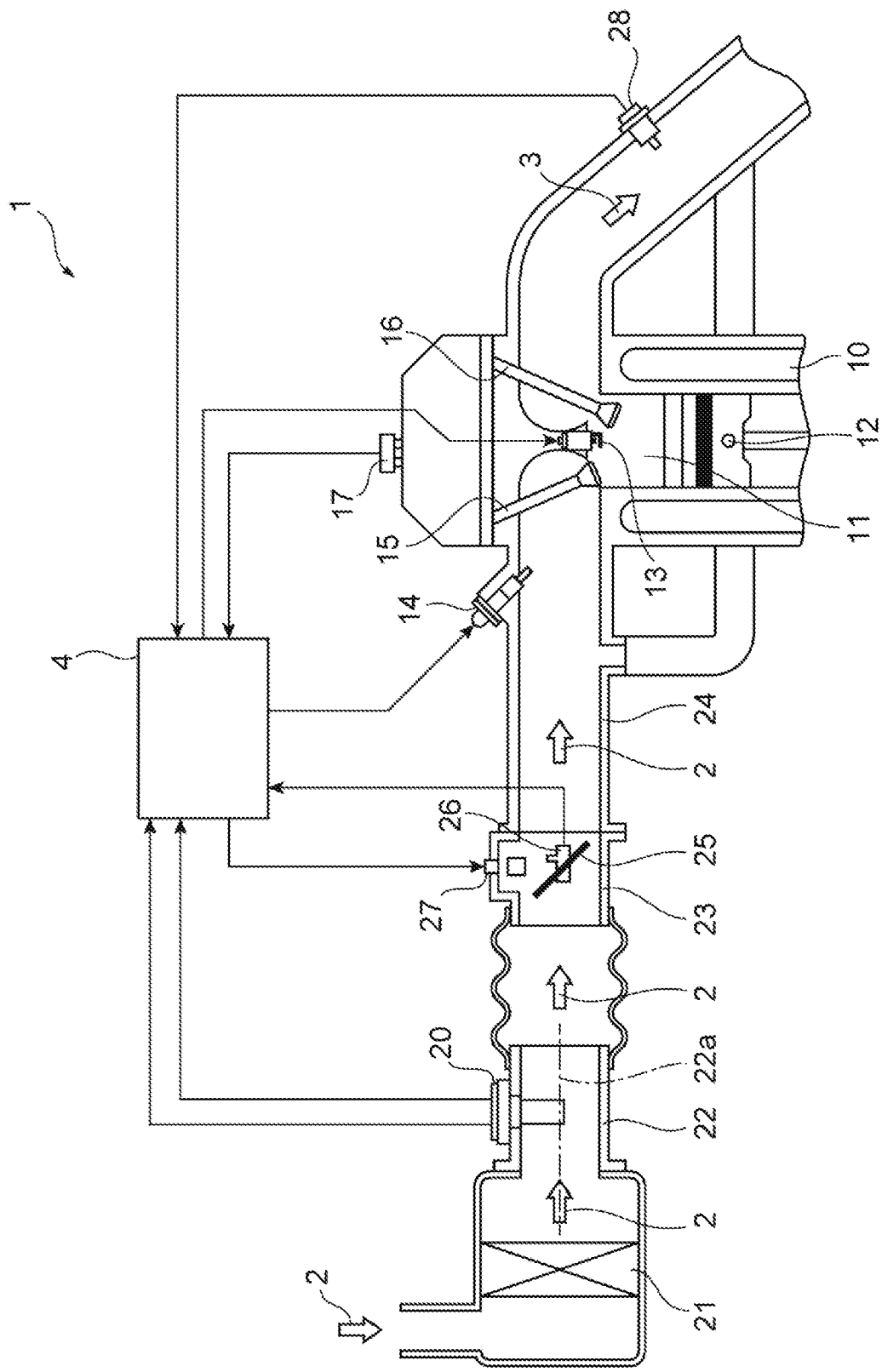
FIG. 1 is a system diagram illustrating one example of an internal combustion engine control system including a physical quantity detection device.

FIG. 1 is a system diagram illustrating one example of an internal combustion engine control system 1 of an electronic fuel injection type using a physical quantity detection device 20 according to the present embodiment. In the internal combustion engine control system 1, intake air as a measured gas 2 is sucked from an air cleaner 21 based on the operation of an internal combustion engine 10 including an engine cylinder 11 and an engine piston 12. The intake air is guided to a combustion chamber of the engine cylinder 11 via an intake body, which is a main passage 22, a throttle body 23, and an intake manifold 24.

A physical quantity of the measured gas 2, which is the intake air guided to the combustion chamber, is measured by the physical quantity detection device 20. In addition, based on the physical quantity measured by the physical quantity detection device 20, fuel is supplied from a fuel injection valve 14 and guided to the combustion chamber, together with the intake air, in a state of an air-fuel mixture. It should be noted that in the present embodiment, the fuel injection valve 14 is provided at an intake port of the internal combustion engine 10, the fuel injected into the intake port is mixed with the intake air, and the mixture of the fuel and intake air is guided to the combustion chamber via an intake valve 15. The air-fuel mixture guided to the combustion chamber is explosively burnt by spark ignition of a spark plug 13, thus generating mechanical energy.

The burnt gas is guided to an exhaust pipe from an exhaust valve 16 and discharged as an exhaust gas 3 from the exhaust pipe to the outside of the vehicle. A flow rate of the measured gas 2, which is the intake air to be guided to the combustion chamber, is controlled by a throttle valve 25, whose opening changes based on the operation of an accelerator pedal. In addition, a fuel supply amount is controlled based on the flow rate of the intake air to be guided to the combustion chamber. By controlling the opening of the throttle valve 25 to control the flow rate of the intake air to be guided to the combustion chamber, it is possible to control the mechanical energy generated by the internal combustion engine 10.

The physical quantity detection device 20 measures a physical quantity, such as a flow rate, a temperature, a humidity, a pressure, and the like of the measured gas 2, which is the intake air introduced via the air cleaner 21, flowing through the main passage 22. The physical quantity detection device 20 outputs an electric signal according to the physical quantity of the intake air. A signal output from the physical quantity detection device 20 is input to a control device 4.

The control device 4 receives an output from a throttle angle sensor 26 that measures the opening of the throttle valve 25. The control device 4 receives an output from a rotation angle sensor 17 so as to measure positions or states of the engine piston 12, the intake valve 15, and the exhaust valve 16 of the internal combustion engine 10 and further a rotation speed of the internal combustion engine 10. The control device 4 receives an output from an oxygen sensor 28 so as to measure a state of mixing ratio between a fuel amount and an air amount based on the state of the exhaust gas 3.

The control device 4 calculates a fuel injection amount and an ignition timing based on the physical quantity of the intake air, which is the output from the physical quantity detection device 20, and the rotation speed of the internal combustion engine 10 measured based on the output from the rotation angle sensor 17. Based on the calculation results, the control device 4 controls the amount of fuel supplied from the fuel injection valve 14 and the ignition timing when ignition is generated by the spark plug 13. In practice, the control device 4 finely controls the fuel supply amount and the ignition timing further based on a temperature measured by the physical quantity detection device 20, a state of change in the throttle angle, a state of change in the rotation speed of the engine, and a state of air fuel ratio measured by the oxygen sensor 28.

The control device 4 further controls an amount of air bypassing the throttle valve 25 by an idle air control valve 27 in an idling state of the internal combustion engine 10, and controls the rotation speed of the internal combustion engine 10 during idling.

The fuel supply amount and the ignition timing, which are the major control amounts of the internal combustion engine 10, are both calculated based on the output from the physical quantity detection device 20 as a main parameter. Therefore, the improvement of measurement accuracy, the reduction of aged deterioration, and the improvement of reliability of the physical quantity detection device 20 are important to improve control accuracy of a vehicle and ensure reliability of a vehicle.

Particularly, in recent years, there are increased demands for fuel saving of a vehicle and purification of exhaust gas. To meet these demands, it is very important to improve the accuracy in the measurement of a physical quantity of intake air, which is the measured gas 2 measured by the physical quantity detection device 20. It is also important that the physical quantity detection device 20 maintains high reliability.

As will be described below, the physical quantity detection device 20 to be mounted on a vehicle not only solves the problem described in Technical Problem to be solved by the invention and produces the effects described in Advantageous Effects of Invention. As will be described below, with due consideration of the above-described various problems to be solved, the physical quantity detection device 20 also solves various problems required to be solved as a product and produces various effects. The specific problems solved and specific effects produced by the physical quantity detection device 20 will be described in the following descriptions relating to embodiments.

Figure 2:
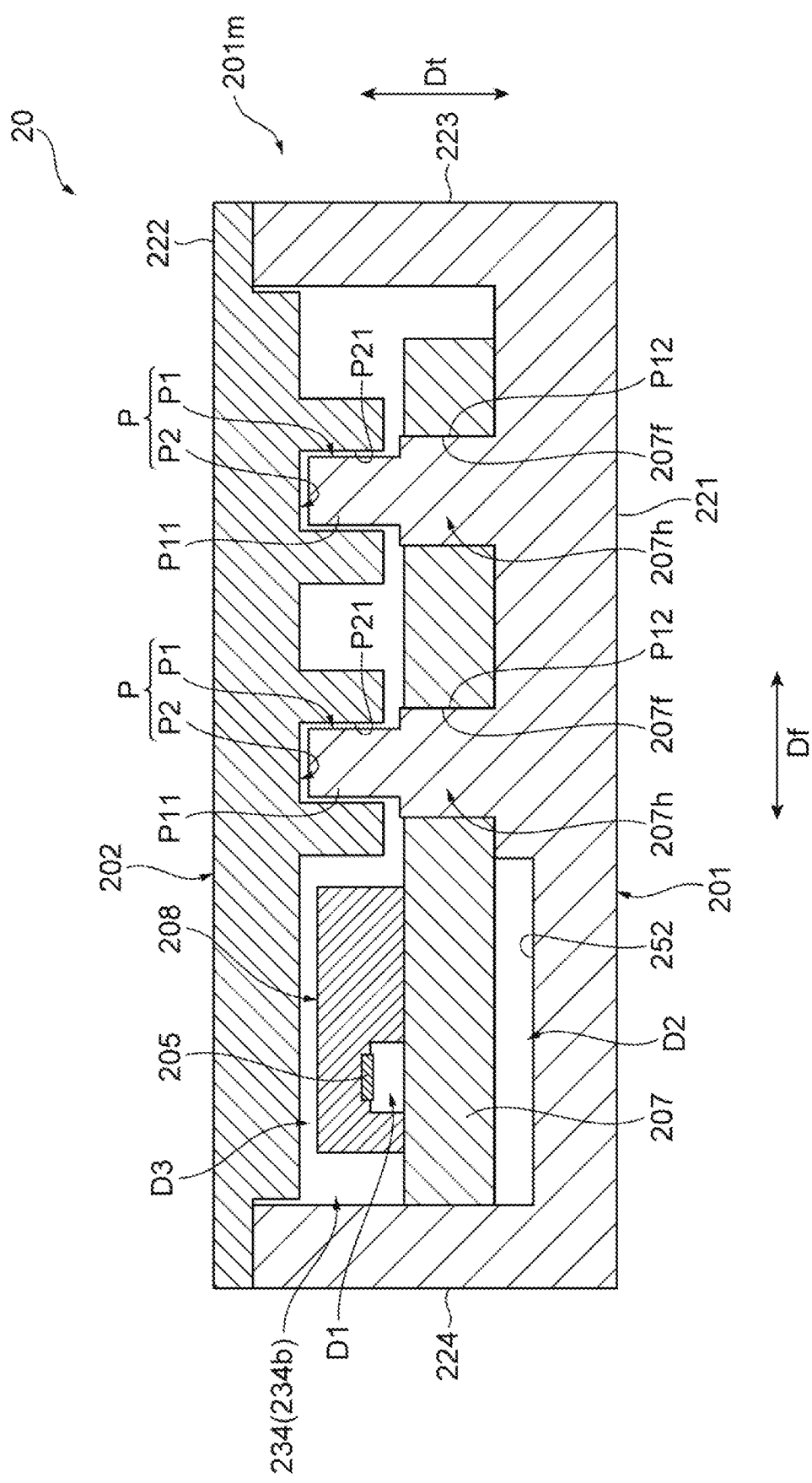
FIG. 2 is a schematic cross-sectional view of a first embodiment of the physical quantity detection device of the present disclosure.
Figure 3:
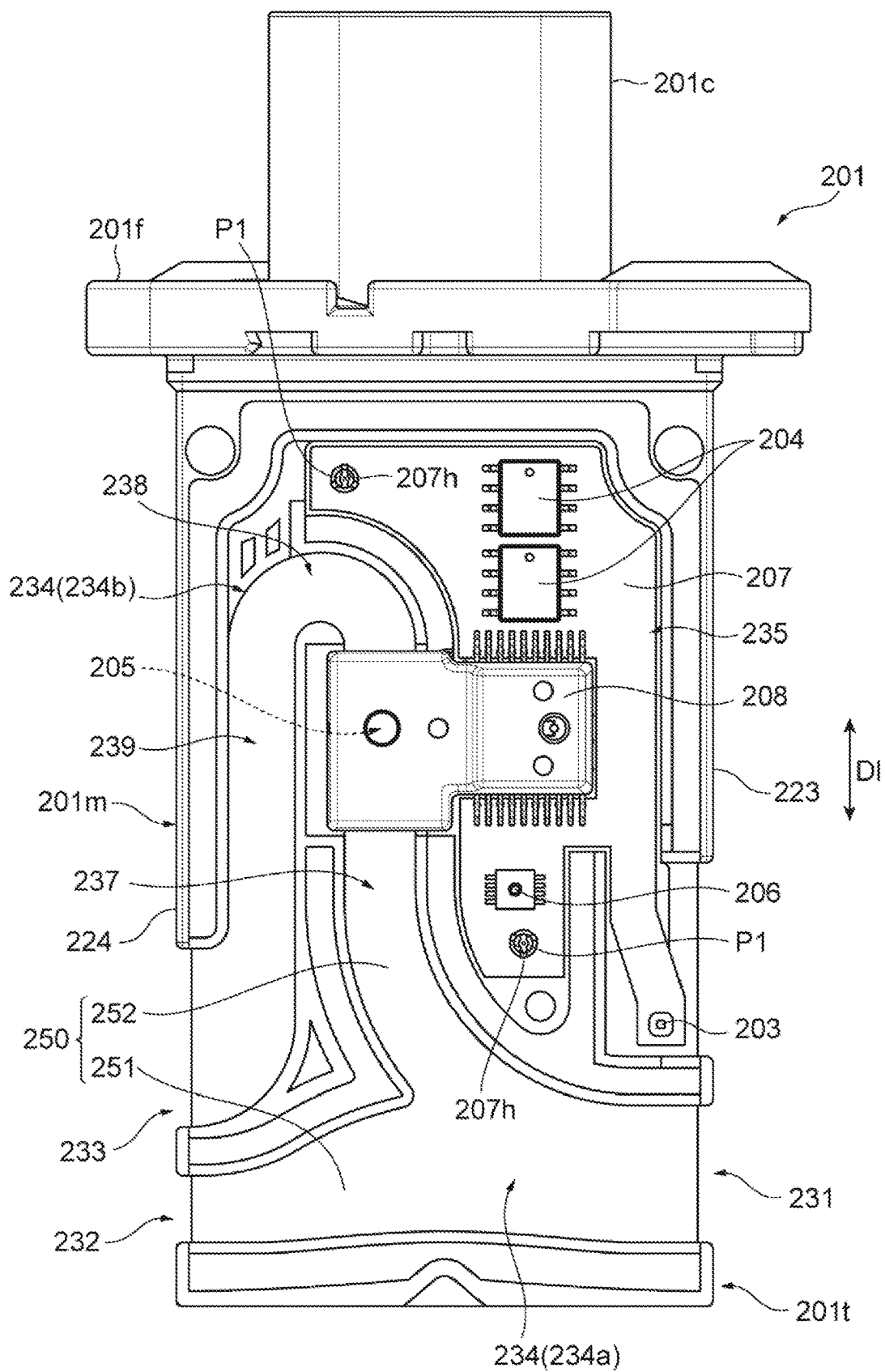
FIG. 3 is a rear view of the physical quantity detection device shown in FIG. 2, illustrating a state where a cover is removed.

FIG. 2 is a schematic cross-sectional view of the physical quantity detection device 20 shown in FIG. 1. FIG. 3 is a rear view of the physical quantity detection device 20 shown in FIG. 2, illustrating a state where a cover 202 is removed.

The physical quantity detection device 20 includes a housing 201 and a cover 202 attached to the housing 201. The housing 201 is made of a synthetic resin material by injection molding, for example. The cover 202 is a plate-like member made of a conductive material, such as an aluminum alloy, or is made of a synthetic resin material by injection molding, for example. The cover 202 is formed into a thin plate, and has a wide flat cooling surface.

The housing 201 includes a flange 201f fixed to the intake body, which is the main passage 22, a connector 201c projected from the flange 201f and exposed to the outside from the intake body for electrical connection to an external device, and a measurement unit 201m extending from the flange 201f so as to project toward the center of the main passage 22.

The flange 201f has an approximately rectangular shape in plan view with a predetermined thickness, and has a through-hole at a corner, for example. The flange 201f is fixed to the main passage 22 by a fixing screw inserted into the through-hole at the corner and screwed into a screw hole of the main passage 22, for example.

The connector 201c is provided with four external terminals and a correction terminal therein, for example. The external terminals include terminals for outputting a physical quantity, such as a flow rate, a temperature, or the like, which is the measurement result of the physical quantity detection device 20, and a power terminal for supplying direct-current power for operating the physical quantity detection device 20. The correction terminal is a terminal used to perform measurement of a manufactured physical quantity detection device 20, obtain a correction value for each physical quantity detection device 20, and store the correction value in memory inside of the physical quantity detection device 20

The measurement unit 201m is in the form of a long thin plate extending from the flange 201f toward the center direction of the main passage 22, and includes a rear face 221 and a front face 222, which are wide, and an upstream end face 223 and a downstream end face 224, which are a pair of narrow side faces. In a state where the physical quantity detection device 20 is attached to the main passage 22, the measurement unit 201m projects from the inner wall of the main passage 22 toward a central axis 22a of the main passage 22, and the rear face 221 and the front face 222 are disposed in parallel along the central axis 22a of the main passage 22.

Further, the measurement unit 201m is disposed such that among the narrow upstream end face 223 and downstream end face 224, the upstream end face 223 at one side of the measurement unit 201m in the transverse direction faces the upstream side of the main passage 22 and the downstream end face 224 at the other side of the measurement unit 201m in the transverse direction faces the downstream side of the main passage 22.

Further, in the measurement unit 201m, the upstream end face 223 at a distal end 201t opposite to the flange 201f at a proximal end is provided with an inlet 231 that is open for introducing a portion of the measured gas 2, such as intake air, into an auxiliary passage 234 within the measurement unit 201m. Further, in the measurement unit 201m, the downstream end face 224 opposite to the upstream end face 223 at the distal end 201t is provided with a first outlet 232 and a second outlet 233 that are open for returning, to the main passage 22, the measured gas 2 introduced into the auxiliary passage 234 within the measurement unit 201m.

In the physical quantity detection device 20, the inlet 231 of the auxiliary passage 234 is provided at the distal end 201t of the measurement unit 201m extending from the flange 201f toward the center direction of the main passage 22. This allows the physical quantity detection device 20 to introduce, into the auxiliary passage, gas not in the vicinity of the inner wall surface of the main passage 22, but gas in a portion near the central part away from the inner wall surface. Accordingly, the physical quantity detection device 20 can measure a flow rate of the gas in the portion away from the inner wall surface of the main passage 22, thus suppressing decrease in the measurement accuracy caused by the effect of heat and the like.

The measurement unit 201m is provided with an auxiliary passage groove 250 for defining the auxiliary passage 234 and a circuit chamber 235 for housing a circuit board 207. The circuit chamber 235 and the auxiliary passage groove 250 are provided so as to be recessed on one surface of the measurement unit 201m in a thickness direction of the plate-like measurement unit 201m. The circuit chamber 235 is disposed at an upstream position in the flow direction of the measured gas 2 in the main passage 22, and the auxiliary passage 234 is disposed at a downstream position in the flow direction of the measured gas 2 in the main passage 22 with respect to the circuit chamber 235.

The auxiliary passage groove 250 defines the auxiliary passage 234 together with the cover 202. The auxiliary passage groove 250 includes a first auxiliary passage groove 251 and a second auxiliary passage groove 252 that branches in the middle of the first auxiliary passage groove 251.

The first auxiliary passage groove 251 is formed so as to extend along the transverse direction of the measurement unit 201m across between the inlet 231 that is open on the upstream end face 223 of the measurement unit 201m and the first outlet 232 that is open on the downstream end face 224 of the measurement unit 201m. The first auxiliary passage groove 251 and the cover 202 define a first auxiliary passage 234a that extends from the inlet 231 to the first outlet 232 along the central axis 22a of the main passage 22.

The second auxiliary passage groove 252 branches from the first auxiliary passage groove 251 toward the flange 201f in the longitudinal direction of the measurement unit 201m and extends in a direction to intersect the central axis 22a of the main passage 22 substantially at the right angle. Furthermore, the second auxiliary passage groove 252 is curved and folded in a U-shape or an arc shape, for example, in the vicinity of the flange 201f of the measurement unit 201m toward the distal end 201t and extends in the longitudinal direction of the measurement unit 201m, that is, in the direction to intersect the central axis 22a of the main passage 22 at the right angle. The second auxiliary passage groove 252 is finally bent so as to be curved in an arc shape, for example, toward the downstream end face 224 of the measurement unit 201m and is connected to the second outlet 233.

The second outlet 233 is open to face the downstream side in the flow direction of the measured gas 2 in the main passage 22. The second outlet 233 has an opening area larger than that of the first outlet 232, and is formed closer to the proximal end of the measurement unit 201m in the longitudinal direction with respect to the first outlet 232. The second auxiliary passage groove 252 and the cover 202 define a second auxiliary passage 234b that branches from the first auxiliary passage 234a toward the flange 201f and extends to the second outlet 233.

The first auxiliary passage 234a introduces the measured gas 2 flowing through the main passage 22 from the inlet 231, and returns the introduced measured gas 2 to the main passage 22 from the first outlet 232. The first auxiliary passage 234a includes a branch portion 236 between the inlet 231 and the first outlet 232. In the forward flow, the measured gas 2 flowing through the main passage 22 is introduced into the first auxiliary passage 234a from the inlet 231, and flows through the first auxiliary passage 234a toward the first outlet 232 and flows into the second auxiliary passage 234b from the branch portion 236.

The second auxiliary passage 234b passes the measured gas 2 that has branched and flown therein from the first auxiliary passage 234a and returns it to the main passage 22 from the second outlet 233. The second auxiliary passage 234b includes a path that runs back and forth along the longitudinal direction of the measurement unit 201m. More specifically, the second auxiliary passage 234b includes an upstream portion 237 in a straight line shape, a curved portion 238 in an arc shape or a U-shape, and a downstream portion 239 in a straight line shape, for example.

The physical quantity detection device 20 includes a flow rate detection unit 205 disposed in the upstream portion 237 of the second auxiliary passage 234b, for example, as a detector that detects a physical quantity. More specifically, in the upstream portion 237 of the second auxiliary passage 234b, the flow rate detection unit 205 is disposed in an intermediate portion between the first auxiliary passage 234a and the curved portion 238. The second auxiliary passage 234b has a curved shape as described above, and thus can ensure a larger passage length and minimize the influence on the flow rate detection unit 205 when pulsation is generated in the measured gas 2 within the main passage 22.

The circuit board 207 is housed in the circuit chamber 235 provided at one side of the measurement unit 201m in the transverse direction. The circuit board 207 has a substantially L-shape that extends along the longitudinal direction of the measurement unit 201m and extends in the transverse direction of the measurement unit 201m at the end of the measurement unit 201m near the flange 201f, for example.

On the surface of the circuit board 207, an intake air temperature sensor 203, a pressure sensor 204, a humidity sensor 206, and a chip package 208 including the flow rate detection unit 205 are mounted. That is, the physical quantity detection device 20 includes the intake air temperature sensor 203, the pressure sensor 204, the flow rate detection unit 205, and the humidity sensor 206 as elements that detect a temperature, a pressure, a flow rate, and a humidity as physical quantities, for example.

The intake air temperature sensor 203 is disposed in a temperature detection passage and measures a temperature of the measured gas 2 flowing through the temperature detection passage, for example. The temperature detection passage includes an inlet in the vicinity of the inlet 231 that is open on the upstream end face 223 of the measurement unit 201m, and includes an outlet on each of the rear face 221 of the measurement unit 201m and the cover 202 attached to the front face 222 of the measurement unit 201m, for example.

The pressure sensor 204 measures a pressure of the measured gas 2 within the circuit chamber 235 and the humidity sensor 206 measures a humidity of the measured gas 2 within the circuit chamber 235. The circuit chamber 235 is defined between the housing 201 and the cover 202 and communicated with the second auxiliary passage 234b via a pressure introduction flow passage. The measured gas 2 flows into the circuit chamber 235 from the second auxiliary passage 234b via the pressure introduction flow passage.

The flow rate detection unit 205 measures a flow rate of the measured gas 2 flowing through a flow passage D1 between a recessed groove of the chip package 208 and the circuit board 207, for example. More specifically, the measured gas 2 flows through the flow passage D1 between the recessed groove of the chip package 208 and the circuit board 207, a flow passage D2 between the second auxiliary passage groove 252 of the housing 201 and the circuit board 207, and a flow passage D3 between the chip package 208 and the cover 202.

Then, a flow rate, which is one of the physical quantities of the measured gas 2 flowing through the flow passage D1 between the recessed groove of the chip package 208 and the circuit board 207, is detected by the flow rate detection unit 205, which is one of the detectors of the physical quantity detection device 20 of the present embodiment. The flow rate detection unit 205 is a thermal air flow meter that includes a pair of temperature sensitive resistors on the opposite sides of a heating resistor in the flow direction of the measured gas 2 and measures a flow rate of air based on a temperature difference between the pair of temperature sensitive resistors, for example.

In the physical quantity detection device 20, decrease in the positioning accuracy of the housing 201 and the cover 202 or the positioning accuracy of the housing 201 and the circuit board 207 may cause variations in dimension and shape of the individual flow passages D2 and D3 through which the measured gas 2 passes. Under such influences, there may be variations in the individual flows of the measured gas 2 passing through the flow passage D1 facing the flow rate detection unit 205 serving as a detector, and the accuracy in the measurement of a flow rate as a physical quantity may be affected.

Therefore, in the physical quantity detection device 20, the improvement of the positioning accuracy of the housing 201 and the cover 202 and the improvement of the positioning accuracy of the housing 201 and the circuit board 207 are important to achieve a higher measurement accuracy in measuring a physical quantity than a conventional device. The following will describe in detail a characteristic configuration of the physical quantity detection device 20 of the present embodiment that is a configuration to solve such a problem. The physical quantity detection device 20 of the present embodiment is mainly characterized by the following configuration.

As described above, the physical quantity detection device 20 includes various detectors that detect physical quantities and the circuit board 207 on which these detectors are mounted. The physical quantity detection device 20 also includes the housing 201 that houses the circuit board 207 and the cover 202 that is fixed to the housing 201 and defines the second auxiliary passage 234b serving as a flow passage in which the flow rate detection unit 205 as one of the detectors is disposed. In addition, the housing 201 and the cover 202 include a positioning portion P. This positioning portion P includes a pin P1 extending in a thickness direction Dt of the circuit board 207 and a fitting portion P2 into which an end portion P11 of the pin P1 is fitted for positioning between the housing 201 and the cover 202. The pin P1 includes an engagement portion P12 that faces an engagement surface 207f of the circuit board 207 along the thickness direction Dt and restricts movement of the circuit board 207 in a surface direction Df along the front and rear surfaces of the circuit board 207.

More specifically, in the examples shown in FIG. 2 and FIG. 3, the pin P1 of the positioning portion P is provided in the housing 201, for example. The pin P1 is made of the same material as the housing 201 by injection molding as a portion of the housing 201 and is formed integrally with the housing 201, for example. It should be noted that the pin P1 may be a member separate from the housing 201 and may be attached to the housing 201.

Further, the pin P1 is formed into a columnar shape with any cross section, such as a columnar shape, an elliptic columnar shape, a square columnar shape, a polygonal columnar shape, or the like, for example. The engagement portion P12 of the pin P1 is provided at a proximal end opposite to the end portion P11 in a projection direction of the pin P1, for example. The outer peripheral surface of the engagement portion P12 of the pin P1 is substantially in parallel with the thickness direction Dt of the circuit board 207, for example. Accordingly, the outer peripheral surface of the engagement portion P12 is facing the engagement surface 207f that is substantially in parallel with the thickness direction Dt of the circuit board 207 in the surface direction Df of the circuit board 207.

The engagement surface 207f of the circuit board 207 is an inner peripheral surface or an inner wall surface of a through-hole 207h provided in the circuit board 207, for example. It should be noted that the engagement surface 207f of the circuit board 207 may be an outer peripheral surface along the edge of the circuit board 207 or may be a wall surface of a cutout portion provided on an edge portion of the circuit board 207, for example. The engagement surface 207f of the circuit board 207 is at least partially contacting or is facing with a small clearance the engagement portion P12 of the pin P1 that faces the circuit board 207 in the surface direction Df. Herein, the small clearance between the engagement surface 207f and the engagement portion P12 equals a dimensional tolerance that allows insertion of the engagement portion P12 of the pin P1 into the through-hole 207h of the circuit board 207, for example.

In the example shown in FIG. 2, the fitting portion P2 of the positioning portion P is provided in the cover 202, for example. The fitting portion P2 is made of the same material as the cover 202 by forging, casting, or injection molding as a portion of the housing 201 and is formed integrally with the cover 202, for example. It should be noted that the fitting portion P2 may be a member separate from the cover 202 and may be attached to the cover 202. In addition, in the examples shown in FIG. 2 and FIG. 3, the pin P1 is configured such that the outside diameter of the engagement portion P12 is larger than the outside diameter of the end portion P11.

Further, in the examples shown in FIG. 2 and FIG. 3, the number of pins P1 and the number of fitting portions P2 of the positioning portion P are each two. Herein, although the schematic cross-sectional view of FIG. 2 shows, for convenience, the flow rate detection unit 205 and the two pins P1 and the two fitting portions P2 of the positioning portion P, they need not exist on the same section as shown in FIG. 3. It should be noted that the number of pins P1 may be not less than 1 and not more than 3, for example, in terms of the improvement of the positioning accuracy of the housing 201, the cover 202, and the circuit board 207 and the reduction of the installation space of the pin(s) P1.

Further, in the example shown in FIG. 2, the fitting portion P2 of the positioning portion P is recessed such that the end portion P11 of the pin P1 is fitted therein, and includes an inner wall surface P21 that faces the outer peripheral surface of the pin P1 in the surface direction Df of the circuit board 207 and restricts movement of the pin P1. The inner wall surface P21 of the fitting portion P2 is formed into a closed-bottomed tubular shape with any cross section, such as a tubular shape, a square tubular shape, a polygonal tubular shape, or the like, in accordance with the shape of the end portion P11 of the pin P1, and surrounds the entire perimeter of the end portion P11 of the pin P1, for example.

FIG. 4A to FIG. 4E respectively show examples of the shape of the end portion P11 and the engagement portion P12 of the pin P1 of the positioning portion P. In each of FIG. 4A to FIG. 4E, the left view is a plan view of the end of the pin P1 as seen in the projection direction of the pin P1 and the right view is a side view of the pin P1 as seen in the direction to intersect the projection direction of the pin P1 at the right angle.

In the examples shown in FIG. 4A to FIG. 4E, the pin P1 is configured such that an outside diameter OD2 of the engagement portion P12 is larger than an outside diameter OD1 of the end portion P11, and a step is formed between the end portion P11 and the engagement portion P12 in a radial direction of the pin P1. It should be noted that the pin P1 may be configured such that the end portion P11 and the engagement portion P12 have the same outside diameter, or the outside diameter may gradually decrease in a tapered manner from the engagement portion P12 to the end of the end portion P11.

In the example shown in FIG. 4A, the pin P1 is configured such that both of the end portion P11 and the engagement portion P12 have a columnar shape. In this case, the fitting portion P2 that allows the end portion P11 of the pin P1 to fit therein is in the form of a closed-bottomed cylindrical recess in accordance with the shape of the end portion P11. In addition, also the through-hole 207h of the circuit board 207, into which the engagement portion P12 of the pin P1 is inserted, is formed into a round hole or a circular hole having a circular opening and a cylindrical inner wall surface, i.e., the engagement surface 207f, in accordance with the outer shape of the engagement portion P12.

Figure 4B:
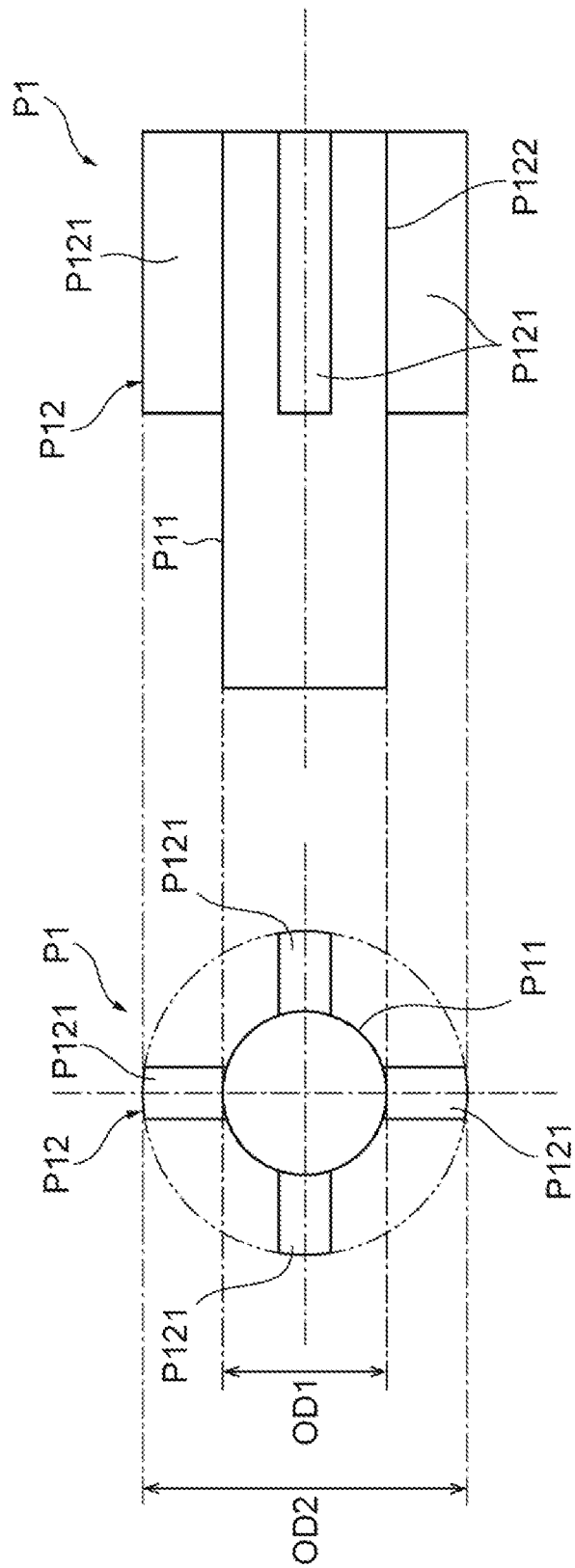
FIG. 4B shows one example of the shape of a pin of a positioning portion of the physical quantity detection device shown in FIG. 2.

In the example shown in FIG. 4B, the pin P1 is configured such that the end portion P11 has a columnar shape and the engagement portion P12 includes a plurality of ribs P121. More specifically, the engagement portion P12 includes a columnar axis portion P122 having the outside diameter OD1 that is equal to that of the end portion P11 and the plurality of ribs P121 that projects from the outer peripheral surface of the axis portion P122 toward the engagement surface 207f of the circuit board 207 in the radial direction of the pin P1. It should be noted that the number of ribs P121 of the engagement portion P12 is not particularly limited and may be 2, 3, 4, 5 or more, for example. In this example as well, the fitting portion P2 shown in FIG. 2 is in the form of a closed-bottomed cylindrical recess in accordance with the shape of the end portion P11 and also the through-hole 207h of the circuit board 207 is formed into a round hole or a circular hole in accordance with the outer shape of the engagement portion P12.

In the example shown in FIG. 4C, the pin P1 is configured such that the end portion P11 includes a plurality of ribs P111 and the engagement portion P12 has a columnar shape. More specifically, the end portion P11 includes a columnar axis portion P112 and the plurality of ribs P111 that projects from the outer peripheral surface of the axis portion P112 toward the inner wall surface P21 of the fitting portion P2 in the radial direction of the pin P1. It should be noted that the number of ribs P111 of the end portion P11 is not particularly limited and may be 2, 3, 4, 5 or more, for example. In this example as well, the fitting portion P2 shown in FIG. 2 is in the form of a closed-bottomed cylindrical recess in accordance with the shape of the end portion P11 and also the through-hole 207h of the circuit board 207 is formed into a round hole or a circular hole in accordance with the outer shape of the engagement portion P12.

Figure 4D:
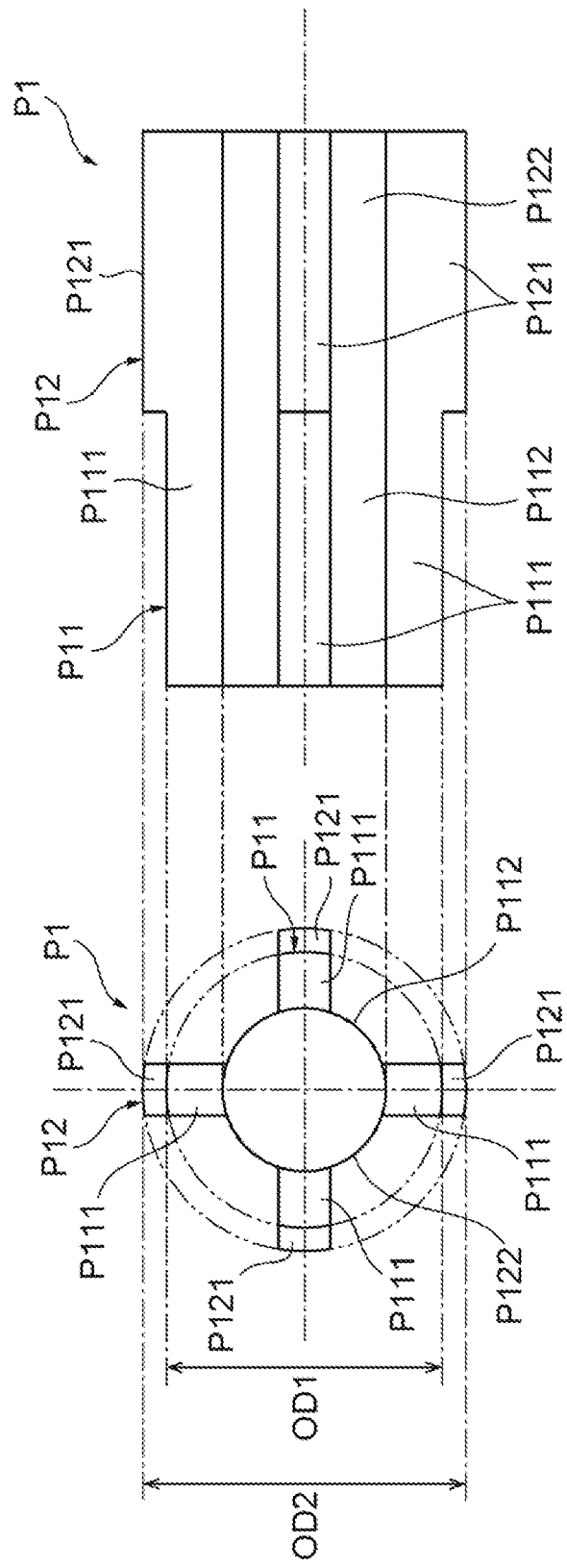
FIG. 4D shows one example of the shape of a pin of a positioning portion of the physical quantity detection device shown in FIG. 2.

In the example shown in FIG. 4D, the pin P1 is configured such that the end portion P11 and the engagement portion P12 respectively include the ribs P111 and the ribs P121. More specifically, the end portion P11 and the engagement portion P12 respectively include the axis portion P112 and the axis portion P122 that have the same outside diameter. In addition, the end portion P11 includes the plurality of ribs P111 that projects from the outer peripheral surface of the axis portion P112 in the radial direction of the pin P1 and the engagement portion P12 includes the plurality of ribs P121 that projects from the outer peripheral surface of the axis portion P122 in the radial direction of the pin P1. It should be noted that the number of ribs P111 of the end portion P11 may be equal to or different from the number of ribs P121 of the engagement portion P12. In this example as well, the fitting portion P2 shown in FIG. 2 is in the form of a closed-bottomed cylindrical recess in accordance with the shape of the end portion P11 and also the through-hole 207h of the circuit board 207 is formed into a round hole or a circular hole in accordance with the outer shape of the engagement portion P12.

In the example shown in FIG. 4E, the pin P1 is configured such that the end portion P11 has a hollow tubular shape, e.g., a cylindrical shape, with an opening P113 at its end, and the engagement portion P12 has a columnar shape. Further, the end portion P11 is provided to include a plurality of slits P114 extending from an end in the projection direction of the pin P1, and in a state of being elastically deformed inwardly in the radial direction of the pin P1, fit into the fitting portion P2. In the example shown in FIG. 4E, although two slits P114 are arranged in the end portion P11 of the pin P1 at an equal angle interval, the number of slits P114 may be 3, 4, 5 or more. In this example as well, the fitting portion P2 shown in FIG. 2 is in the form of a closed-bottomed cylindrical recess in accordance with the shape of the end portion P11 and also the through-hole 207h of the circuit board 207 is formed into a round hole or a circular hole in accordance with the outer shape of the engagement portion P12.

It should be noted that in the examples shown in FIG. 4C and FIG. 4D, the outside diameter OD1 of the end portion P11 of the pin P1 may be slightly larger than the inside diameter of the fitting portion P2, and the end portion P11 of the pin P1 may be fitted into the fitting portion P2 in a state where a portion of the ribs P111 is elastically deformed or plastically deformed. In the same manner, in the examples shown in FIG. 4B and FIG. 4D, the outside diameter OD2 of the engagement portion P12 of the pin P1 may be slightly larger than the inside diameter of the through-hole 207h of the circuit board 207, and the engagement portion P12 may be engaged with the engagement surface 207f of the circuit board 207 in a state where a portion of the ribs P121 is elastically deformed or plastically deformed.

FIG. 5 shows one example of the shape of the engagement portion P12 of the pin P1 and the arrangement of the through-holes 207h of the circuit board 207. In the example shown in FIG. 5, in the same manner as the example shown in FIG. 3, a pair of pins P1 is inserted into a pair of through-holes 207h provided in the circuit board 207 at one end and the other end in one direction D1 along the surface direction Df. Herein, the one direction D1 along the surface direction Df of the circuit board 207 is equal to the longitudinal direction of the measurement unit 201m of the housing 201 as shown in FIG. 3, for example.

Further, in the example shown in FIG. 5, the plurality of ribs P121 of the pair of pins P1 includes an outer rib P123 that projects outwardly of the circuit board 207 in the one direction D1 and an inner rib P124 that projects in a direction to have an angle of 90 degrees or larger with respect to the projection direction of the outer rib P123. Further, a dimension L3 from the end of the outer rib P123 to the center of the pin P1 includes a positive dimensional tolerance that is equal to or larger than the radius of the through-hole 207h. Further, a dimension L4 from the end of the inner rib P124 to the center of the pin P1 includes a negative dimensional tolerance that is equal to or smaller than the radius of the through-hole 207h.

More specifically, in the examples shown in FIG. 3 and FIG. 5, the engagement portion P12 of the pin P1 includes one outer rib P123. This outer rib P123 projects in the one direction D1 that is in parallel with the longitudinal direction of the measurement unit 201m of the housing 201, that is, the longitudinal direction of the circuit board 207. In addition, the engagement portion P12 of the pin P1 includes two inner ribs P124. These two inner ribs P124 project in a direction to have an angle of 90 degrees or larger, e.g., about 135 degrees, in the leftward rotation direction and the rightward rotation direction, respectively, with respect to the outer rib P123.

The following will describe functions of the physical quantity detection device 20 of the present embodiment.

As described above, the physical quantity detection device 20 of the present embodiment includes detectors that detect physical quantities, such as the intake air temperature sensor 203, the pressure sensor 204, the flow rate detection unit 205, and the humidity sensor 206, and the circuit board 207 on which the detectors are mounted. Further, the physical quantity detection device 20 includes the housing 201 that houses the circuit board 207 and the cover 202 that is fixed to the housing 201 and defines a flow passage in which the flow rate detection unit 205 as a detector is disposed. In this physical quantity detection device 20, the housing 201 and the cover 202 include the positioning portion P. The positioning portion P includes the pin P1 extending in the thickness direction Dt of the circuit board 207 and the fitting portion P2 into which the end portion P11 of the pin P1 is fitted for positioning between the housing 201 and the cover 202. In addition, the pin P1 includes the engagement portion P12 that faces the engagement surface 207f of the circuit board 207 along the thickness direction Dt and restricts movement of the circuit board 207 in the surface direction Df along the front and rear surfaces of the circuit board 207.

With such a configuration, the physical quantity detection device 20 of the present embodiment can achieve a higher positioning accuracy of the housing 201 and the cover 202 than a conventional device and reduce the variations in the individual flows of a fluid passing through the flow passage in which a detector is disposed. Therefore, according to the present embodiment, it is possible to provide the physical quantity detection device 20 that can achieve a higher measurement accuracy in measuring a physical quantity by a detector than a conventional device.

More specifically, as a comparative example not included in the embodiment of the present disclosure, a physical quantity detection device includes a first pin and a first fitting portion for positioning between a housing and a cover and a second pin and a second fitting portion for positioning between the housing and a circuit board. In this physical quantity detection device of the comparative example, the first pin and the first fitting portion are disposed separately from the second pin and the second fitting portion in a surface direction of the circuit board.

Then, the positional relation between the first pin and first fitting portion and the second pin and second fitting portion varies depending on tolerances at the time of manufacturing, and this may cause variations in dimension and shape of the individual flow passages of a measured gas defined by the housing and the cover among the physical quantity detection devices. Thus, there may be variations in the individual flows of the measured gas, for which a physical quantity is to be measured by a detector disposed in the flow passage, and the accuracy in the measurement of a physical quantity may be affected.

In contrast, the physical quantity detection device 20 of the present embodiment can perform positioning between the housing 201 and the cover 202 by fitting the end portion P11 of the pin P1 into the fitting portion P2 of the positioning portion P. In addition, the engagement portion P12 of the same pin P1 is facing the engagement surface 207f of the circuit board 207 in the surface direction Df of the circuit board 207. With such a configuration, even if there is a force acting to move the circuit board 207 in the surface direction Df, the engagement portion P12 of the pin P1 abuts on the engagement surface 207f of the circuit board 207, thus generating a reaction force, such that displacement of the circuit board 207 can be avoided.

That is, the physical quantity detection device 20 of the present embodiment can also perform positioning between the housing 201 and the circuit board 207 with the pin P1 for positioning between the housing 201 and the cover 202. This means that, with a single pin P1, the physical quantity detection device 20 of the present embodiment can achieve functions of the two pins, namely, the first pin and the second pin, of the above-described physical quantity detection device of the comparative example. Consequently, the physical quantity detection device 20 of the present embodiment can solve the problem caused by the tolerances between the first pin and first fitting portion and the second pin and second fitting portion in the detection of a physical quantity of the comparative example.

Therefore, according to the present embodiment, it is possible to provide the physical quantity detection device 20 that can achieve a higher measurement accuracy in measuring a physical quantity by a detector than a conventional device by improving the positioning accuracy of the housing 201 and the cover 202 as compared to the conventional device and reducing the variations in the individual flows of a fluid passing through the flow passage in which the detector is disposed.

In addition, the physical quantity detection device 20 of the present embodiment can reduce the number of installed pins P1 by integrating the functions of the two pins, namely, the first pin and the second pin, of the physical quantity detection device of the comparative example, into one single pin P1. Consequently, within a space defined by the housing 201 and the cover 202, the physical quantity detection device 20 can increase the installation space of components other than the positioning portion P, including the circuit board 207 and the detector, and increase the layout flexibility.

Further, in the physical quantity detection device 20 of the present embodiment, the pin P1 is configured such that the outside diameter OD2 of the engagement portion P12 is larger than the outside diameter OD1 of the end portion P11.

With this configuration, for example, in the manufacturing of the physical quantity detection device 20, when housing the circuit board 207 in the housing 201 in the thickness direction Dt, that is, the projection direction of the pin P1, it is possible to reduce the likelihood that the end portion P11 of the pin P1 will interfere with the engagement surface 207f of the circuit board 207. Consequently, it is possible to improve the workability of the assembly work of housing the circuit board 207 in the housing 201 by moving the circuit board 207 from the end portion P11 to the engagement portion P12 in the projection direction of the pin P1, and improve the ease of assembly of the physical quantity detection device 20.

Further, in the physical quantity detection device 20 of the present embodiment, the pin P1 is provided in the housing 201, and the fitting portion P2 is provided in the cover 202.

With this configuration, for example, in the manufacturing of the physical quantity detection device 20, when housing the circuit board 207 in the housing 201, it is possible to allow the engagement portion P12 of the pin P1 provided in the housing 201 to face the engagement surface 207f of the circuit board 207 and perform positioning between the housing 201 and the circuit board 207. Consequently, it is possible to precisely dispose the detector mounted on the circuit board 207 at a predetermined position within the housing 201.

Thereafter, when fixing the cover 202 to the housing 201, it is possible to perform positioning between the housing 201 and the cover 202 by fitting the end portion P11 of the pin P1 provided in the housing 201 into the fitting portion P2 provided in the cover 202. Consequently, in the physical quantity detection device 20, it is possible to reduce the variations in shape and dimension of the individual auxiliary passages 234 defined by the housing 201 and the cover 202 and improve the measurement accuracy of a detector including the flow rate detection unit 205.

Further, in the physical quantity detection device 20 of the present embodiment, the fitting portion P2 is recessed such that the end portion P11 of the pin P1 is fitted therein, and includes the inner wall surface P21 that faces the outer peripheral surface of the pin P1 in the surface direction Df of the circuit board 207 and restricts movement of the pin P1.

With this configuration, for example, in the manufacturing of the physical quantity detection device 20, it is possible to perform positioning between the housing 201 and the cover 202 in the surface direction Df of the circuit board 207 by fitting the pin P1 of the positioning portion P for positioning between the housing 201 and the cover 202 into the fitting portion P2. That is, when there is a force acting in the surface direction Df of the circuit board 207 between the housing 201 and the cover 202, the outer peripheral surface of the pin P1 of the positioning portion P abuts on the inner wall surface P21 of the recessed fitting portion P2, thus generating a reaction force. Consequently, it is possible to avoid displacement of the housing 201 and the cover 202 in the surface direction Df of the circuit board 207 and perform positioning between the housing 201 and the cover 202 in the surface direction Df of the circuit board 207.

Further, in the physical quantity detection device 20 of the present embodiment, the end portion P11 and the engagement portion P12 of the pin P1 of the positioning portion P may be formed into a columnar shape as shown in FIG. 4A, for example.

With this configuration, for example, when the fitting portion P2 of the positioning portion P is in the form of a closed-bottomed cylindrical recess and the engagement surface 207f of the circuit board 207 is the tubular through-hole 207h having openings on the opposite ends in the surface direction Df, the effect of binding members by the positioning portion P can be easily managed. That is, clearance, tightening, and the like can be easily managed between the end portion P11 of the pin P1 and the inner wall surface P21 of the fitting portion P2 as well as between the engagement portion P12 of the pin P1 and the engagement surface 207f of the circuit board 207.

Further, in the physical quantity detection device 20 of the present embodiment, the engagement portion P12 of the pin P1 of the positioning portion P includes the plurality of ribs P121 that projects in the radial direction of the pin P1 toward the engagement surface 207*f*, which is the inner wall surface of the through-hole 207*h* of the circuit board 207 as shown in FIG. 2, FIG. 3, and FIG. 4B, for example.

With this configuration, it is possible to allow the ends of the plurality of ribs P121 provided on the engagement portion P12 of the pin P1 to face the engagement surface 207*f* of the circuit board 207, restrain movement of the circuit board 207 in the surface direction Df of the circuit board 207, and perform positioning of the circuit board 207. Furthermore, as compared to the case where the engagement portion P12 of the pin P1 has a columnar shape, it is possible to reduce a contact area between the engagement portion P12 and the engagement surface 207*f* of the circuit board 207 and reduce stress acting on the engagement portion P12. Therefore, even if the engagement portion P12 of the pin P1 has a low rigidity, it is possible to perform binding and positioning of the circuit board 207 while reducing stress acting on the engagement portion P12.

Further, in the physical quantity detection device 20 of the present embodiment, the end portion P11 of the pin P1 of the positioning portion P may include the plurality of ribs P121 that projects in the radial direction of the pin P1 toward the inner wall surface P21 of the fitting portion P2 as shown in FIG. 2 and FIG. 4C, for example.

With this configuration, it is possible to allow the ends of the plurality of ribs P111 provided on the end portion P11 of the pin P1 to face the inner wall surface P21 of the fitting portion P2, restrain relative movement between the housing 201 and the cover 202, and perform positioning between the housing 201 and the cover 202. Furthermore, as compared to the case where the end portion P11 of the pin P1 has a columnar shape, it is possible to reduce a contact area between the end portion P11 and the inner wall surface P21 of the fitting portion P2 and reduce stress acting on the end portion P11. Therefore, even if the end portion P11 of the pin P1 has a low rigidity, it is possible to perform binding and positioning of the housing 201 and the cover 202 while reducing stress acting on the end portion P11.

Further, in the physical quantity detection device 20 of the present embodiment, the end portion P11 and the engagement portion P12 of the pin P1 of the positioning portion P may respectively include the plurality of ribs P111 and the plurality of ribs P121 as shown in FIG. 2 and FIG. 4D, for example. With this configuration, the physical quantity detection device 20 can produce combined effects of the pin P1 in the above-described example shown in FIG. 4C and the pin P1 in the above-described example shown in FIG. 4D.

Further, in the physical quantity detection device 20 of the present embodiment, the end portion P11 of the pin P1 has a hollow tubular shape with the opening P113 at an end as shown in FIG. 4E, for example, and includes the plurality of slits P114 extending from the end in the projection direction of the pin P1. This pin P1, in a state of being elastically deformed inwardly in the radial direction, fits into the fitting portion P2.

With this configuration, the end portion P11 of the pin P1 can be fitted into the fitting portion P2 in a state where the outer peripheral surface of the end portion P11 of the pin P1 is urged outwardly in the radial direction and pressed against the inner wall surface P21 of the fitting portion P2. Consequently, there is no clearance between the outer peripheral surface of the end portion P11 of the pin P1 and the inner wall surface P21 of the fitting portion P2, and thus it is possible to more surely bind the housing 201 and the cover 202 and perform positioning between the housing 201 and the cover 202 with higher accuracy.

Further, in the physical quantity detection device 20 of the present embodiment, the engagement surface 207*f* of the circuit board 207 includes the inner wall surface of the through-hole 207*h* provided in the circuit board 207 as shown in FIG. 2 and FIG. 3, for example.

With this configuration, it is possible to insert the pin P1 of the positioning portion P into the through-hole 207*h* of the circuit board 207 and allow the entire perimeter of the outer peripheral surface of the engagement portion P12 of the pin P1 to face the inner wall surface of the through-hole 207*h*, which is the engagement surface 207*f* of the circuit board 207. Accordingly, with a single pin P1 and a single through-hole 207*h* of the circuit board 207, it is possible to restrict movement of the circuit board 207 in any direction along the surface direction Df of the circuit board 207. Therefore, it is possible to reduce the number of installed pins P1, relatively increase the installation space of components such as the circuit board 207 and the detector, downsize the physical quantity detection device 20, and increase the flexibility of the layout of the circuit board 207, the detector, and the like.

Further, in the physical quantity detection device 20 of the present embodiment, the pair of pins P1 is inserted into the pair of through-holes 207*h* provided in the circuit board 207 at one end and the other end in the one direction D1 along the surface direction Df as shown in FIG. 5, for example. In this example, the plurality of ribs P121 of the engagement portion P12 of the pair of pins P1 includes the outer rib P123 that projects outwardly of the circuit board 207 in the one direction D1 and the inner rib P124 that projects in a direction to have an angle of 90 degrees or larger with respect to the projection direction of the outer rib P123. Then, the dimension L3 from the end of the outer rib P123 to the center of the pin P1 includes a positive dimensional tolerance that is equal to or larger than the radius of the through-hole 207*h* of the circuit board 207. The dimension L4 from the end of the inner rib P124 to the center of the pin P1 includes a negative dimensional tolerance that is equal to or smaller than the radius of the through-hole 207*h* of the circuit board 207.

With this configuration, in the one direction D1 along the surface direction Df of the circuit board 207, the outer ribs P123 of the pair of pins P1 apply forces in the opposite directions to each other toward the outside of the circuit board 207 onto the engagement surfaces 207*f*, which are the inner wall surfaces of the pair of through-holes 207*h* of the circuit board 207. More specifically, for example, in the engagement portion P12 of the pin P1, the end portion of the outer rib P123, in a state of being elastically deformed or plastically deformed, abuts on the inner wall surface of the through-hole 207*h* of the circuit board 207, and applies a force toward the outside in the surface direction Df onto the inner wall surface. Accordingly, with the engagement portion P12 of the pin P1, it is possible to perform binding and positioning of the circuit board 207 in a state where a tensile force is acting between the pair of through-holes 207*h* of the circuit board 207. Therefore, it is possible to prevent the circuit board 207 from being inclined in the one direction D1 along the surface direction Df, and perform positioning of the circuit board 207 with higher accuracy.

Further, in the physical quantity detection device 20 of the present embodiment, the number of pins P1 is not less than 1 and not more than 3, for example.

With this configuration, the physical quantity detection device 20 of the present embodiment can avoid increase in the installation space of the pin(s) P1 and perform, with high accuracy, positioning between the housing 201 and the cover 202 and positioning between the housing 201 and the circuit board 207. In particular, when the number of pins P1 is 1, the physical quantity detection device 20 of the present embodiment can further increase the installation space of components such as the circuit board 207, the detector, and the like, and more surely downsize the physical quantity detection device 20 and increase the flexibility of the layout of the circuit board 207, the detector, and the like.

Further, when the number of pins P1 is 2, the physical quantity detection device 20 of the present embodiment can suppress relative rotation between the housing 201 and the cover 202 around the rotation axis parallel to the projection direction of the pin P1 and relative rotation between the housing 201 and the circuit board 207. Therefore, the physical quantity detection device 20 of the present embodiment can perform, with higher accuracy, positioning between the housing 201 and the cover 202 and positioning between the housing 201 and the circuit board 207.

Further, when the number of pins P1 is 3, the physical quantity detection device 20 of the present embodiment can not only suppress the above rotations, but also increase a binding force between the housing 201 and the cover 202 and a binding force between the housing 201 and the circuit board 207 in the projection direction of the pin P1. Consequently, it is possible to avoid displacement of the circuit board 207 in the thickness direction caused by, for example, the effect of an adhesive used to bond the circuit board 207 to the housing 201.

As described above, according to the present embodiment, it is possible to provide the physical quantity detection device 20 that can achieve a higher measurement accuracy in measuring a physical quantity by a detector than a conventional device by improving the positioning accuracy of the housing 201 and the cover 202 as compared to the conventional device and reducing the variations in the individual flows of a fluid passing through the flow passage in which the detector is disposed.

Second Embodiment

Figure 6:
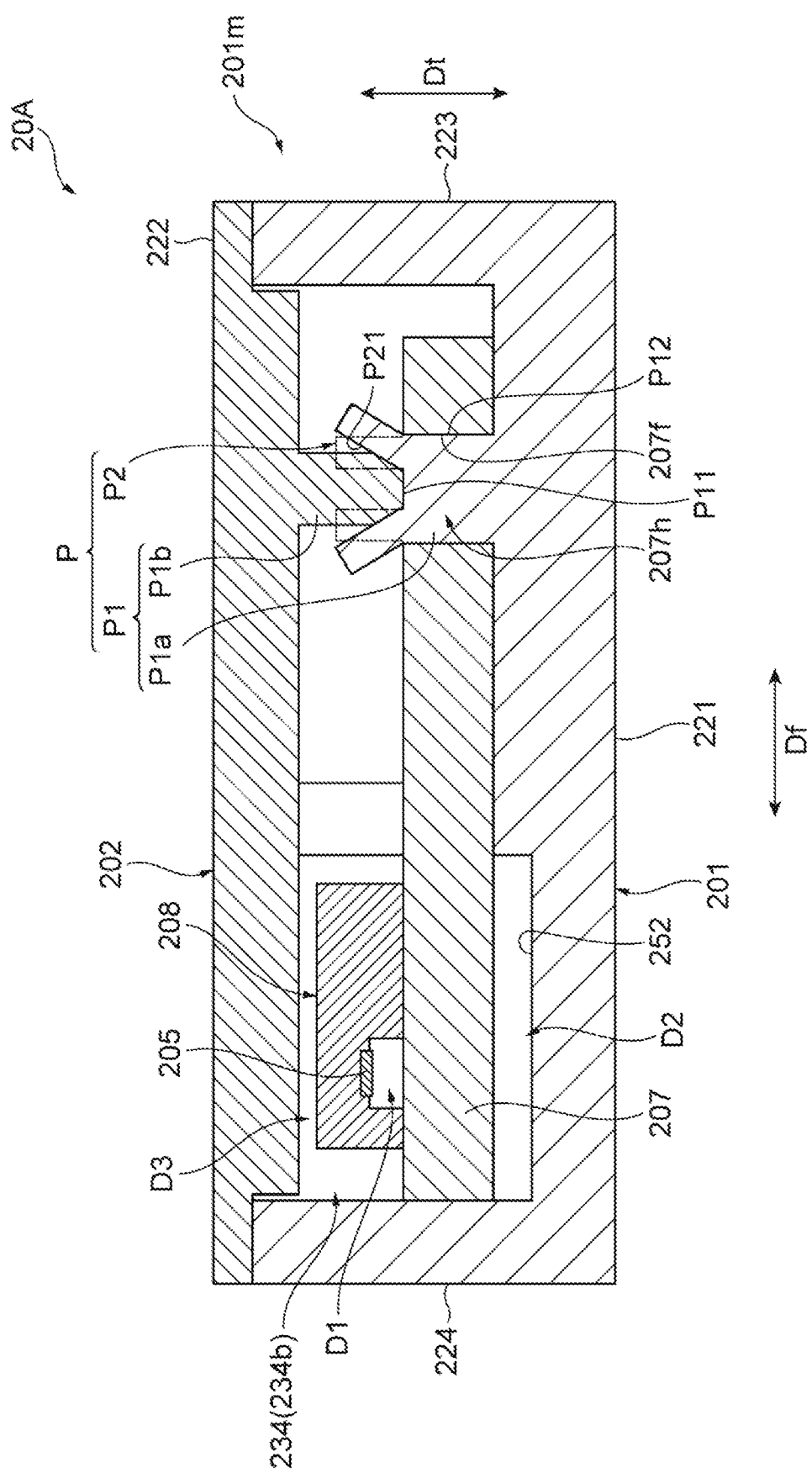
FIG. 6 is a schematic cross-sectional view of a second embodiment of the physical quantity detection device of the present disclosure.

Next, the following will describe a second embodiment of the physical quantity detection device according to the present disclosure with reference to FIG. 6 in conjunction with FIG. 1 and FIG. 3 to FIG. 5. FIG. 6 is a schematic cross-sectional view of a physical quantity detection device 20A of the present embodiment corresponding to FIG. 2 showing the foregoing first embodiment.

The physical quantity detection device 20A of the present embodiment is different from the above-described physical quantity detection device 20 of the first embodiment in the configuration of the positioning portion P. Since the other configurations of the physical quantity detection device 20A of the present embodiment are similar to those of the above-described physical quantity detection device 20 of the first embodiment, the same reference numerals are given to similar parts and the descriptions thereof are omitted.

As shown in FIG. 6, in the physical quantity detection device 20A of the present embodiment, a pin P1 includes a first portion P1a provided in a housing 201 and including an engagement portion P12 and a second portion P1b provided in a cover 202 and including an end portion P11. A fitting portion P2 is provided at the end of the first portion P1a of the pin P1, and a diameter of the fitting portion P2 is expanded by fitting the end portion P11 of the second portion P1b of the pin P1 therein to restrict movement of a circuit board 207 in the thickness direction Dt of the circuit board 207.

With such a configuration, the physical quantity detection device 20A of the present embodiment can not only produce the effect similar to that of the above-described physical quantity detection device 20 of the first embodiment, but also more surely perform positioning of the circuit board 207 in the thickness direction Dt. More specifically, in the manufacturing of the physical quantity detection device 20, first, the circuit board 207 is housed in the housing 201 as shown in FIG. 6.

Then, the first portion P1a of the pin P1 provided in the housing 201 is inserted into a through-hole 207h of the circuit board 207, and the engagement portion P12 of the first portion P1a is allowed to face an engagement surface 207f of the circuit board 207. In this state, the cover 202 is fixed to the housing 201, and the end portion P11 of the second portion P1b of the pin P1 provided in the cover 202 is fitted into the fitting portion P2 at the end of the first portion P1a of the pin P1 provided in the housing 201.

Consequently, the fitting portion P2 at the end of the first portion P1a of the pin P1 is expanded from the inside to the outside by the end portion P11 of the second portion P1b of the pin P1, and the diameter of the fitting portion P2 is thus expanded. Here, as shown in FIG. 6, the outside diameter of the end portion P11 of the pin P1 is larger than the inside diameter of the fitting portion P2. It should be noted that in terms of ease of fitting, it is preferable that the end portion P11 of the second portion P1b of the pin P1 be tapered and the outside diameter of the end of the second portion P1b be smaller than the inside diameter of the fitting portion P2 at the end of the first portion P1a.

As described above, after the first portion P1a of the pin P1 is inserted into the through-hole 207h of the circuit board 207, the diameter of the fitting portion P2 at the end of the first portion P1a is expanded, such that the fitting portion P2 functions as a "barb" that prevents the first portion P1a from dropping off the circuit board 207. Consequently, for example, it is possible to avoid displacement of the circuit board 207 in the thickness direction caused by curing of an adhesive used to bond the circuit board 207 to the housing 201 and the like, and improve the positioning accuracy in the thickness direction Dt of the circuit board 207.

Although the embodiments of the physical quantity detection device according to the present disclosure have been described in detail above with reference to the drawings, specific configurations are not limited thereto, and any design changes that fall within the spirit and scope of the present disclosure are encompassed by the scope of the present disclosure.

REFERENCE SIGNS LIST

20 Physical quantity detection device
201 Housing
202 Cover
203 Intake air temperature sensor (detector)
204 Pressure sensor (detector)
205 Flow rate detection unit (detector)
206 Humidity sensor (detector)
207 Circuit board
207f Engagement surface
207h Through-hole
234 Auxiliary passage (flow passage)
Df Surface direction
D1 One direction
Dt Thickness direction
L3 Dimension
L4 Dimension OD2 Outside diameter of engagement portion
OD1 Outside diameter of end portion
P Positioning portion
P1 Pin
P11 End portion
P111 Rib
P113 Opening
P114 Slit
P12 Engagement portion
P121 Rib
P123 Outer rib
P124 Inner rib
P1a First portion
P1b Second portion
P2 Fitting portion
P21 Inner wall surface

The invention claimed is:

1. A physical quantity detection device comprising:
a detector that detects a physical quantity;
a circuit board on which the detector is mounted;
a housing that houses the circuit board; and
a cover that is fixed to the housing and defines a flow passage in which the detector is disposed, wherein:
the housing and the cover include a positioning portion,
the positioning portion includes a pin extending in a thickness direction of the circuit board and a fitting portion into which an end portion of the pin is fitted for positioning between the housing and the cover,
the pin includes an engagement portion that faces an engagement surface of the circuit board along the thickness direction and restricts movement of the circuit board in a surface direction along front and rear surfaces of the circuit board,
the pin includes a first portion provided in the housing and including the engagement portion and a second portion provided in the cover and including the end portion, and
the fitting portion is provided at an end of the first portion of the pin, and a diameter of the fitting portion is configured to expand by fitting the end portion of the second portion of the pin therein to restrict movement of the circuit board in the thickness direction of the circuit board.

2. The physical quantity detection device according to claim 1, wherein the pin is configured such that an outside diameter of the engagement portion is larger than an outside diameter of the end portion.

3. The physical quantity detection device according to claim 1,
wherein:
the pin is provided in the housing, and
the fitting portion is provided in the cover.

4. The physical quantity detection device according to claim 1, wherein the fitting portion is recessed such that the end portion of the pin is fitted therein, and the fitting portion includes an inner wall surface that faces an outer peripheral surface of the pin in the surface direction of the circuit board and restricts movement of the pin.

5. The physical quantity detection device according to claim 4, wherein the end portion of the pin includes a plurality of ribs that projects in a radial direction of the pin toward the inner wall surface of the fitting portion.

6. The physical quantity detection device according to claim 4, wherein the end portion of the pin has a hollow tubular shape with an opening at an end, the end portion of the pin includes a plurality of slits extending from the end in a projection direction of the pin, and in a state of being elastically deformed inwardly in the radial direction of the pin, fits into the fitting portion.

7. The physical quantity detection device according to claim 1, wherein the engagement surface includes an inner wall surface of a through-hole provided in the circuit board.

8. The physical quantity detection device according to claim 7, wherein the engagement portion of the pin includes a plurality of ribs that projects in the radial direction of the pin toward the inner wall surface of the through-hole.

9. The physical quantity detection device according to claim 8,
wherein:
a pair of the pins is inserted into a pair of the through-holes provided in the circuit board at one end and another end in one direction along the surface direction,
the plurality of ribs of the pair of the pins includes an outer rib that projects outwardly of the circuit board in the one direction and an inner rib that projects in a direction to have an angle of 90 degrees or larger with respect to a projection direction of the outer rib,
a dimension from an end of the outer rib to a center of the pin includes a positive dimensional tolerance that is equal to or larger than a radius of the through-hole, and
a dimension from an end of the inner rib to a center of the pin includes a negative dimensional tolerance that is equal to or smaller than a radius of the through-hole.

10. The physical quantity detection device according to claim 1, wherein a number of pins is not less than 1 and not more than 3.

* * * * *